United States Patent
Kosaka

(10) Patent No.: US 12,264,632 B2
(45) Date of Patent: Apr. 1, 2025

(54) INTERNAL COMBUSTION ENGINE AND CONTROLLER FOR INTERNAL COMBUSTION ENGINE

(71) Applicant: TOYOTA JIDOSHA KABUSHIKI KAISHA, Toyota (JP)

(72) Inventor: Hiroaki Kosaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/624,549

(22) Filed: Apr. 2, 2024

(65) Prior Publication Data

US 2024/0337224 A1   Oct. 10, 2024

(30) Foreign Application Priority Data

Apr. 5, 2023 (JP) .................. 2023-061621

(51) Int. Cl.
*F02D 41/00* (2006.01)
*F02M 21/02* (2006.01)
*F02M 25/025* (2006.01)

(52) U.S. Cl.
CPC ..... *F02D 41/0027* (2013.01); *F02M 21/0275* (2013.01); *F02M 25/025* (2013.01); *F02M 21/0206* (2013.01)

(58) Field of Classification Search
CPC ............ F02M 25/025; F02M 21/0275; F02M 21/0206; F02D 41/0027
See application file for complete search history.

(56) References Cited

U.S. PATENT DOCUMENTS

| 12,085,032 B2 * | 9/2024 | Tabata ............... F02D 41/0235 |
| 2017/0138313 A1 * | 5/2017 | Fujimoto ............... F02M 25/03 |

FOREIGN PATENT DOCUMENTS

| JP | 2007113461 A | * | 5/2007 |
| JP | 2022-003250 A |  | 1/2022 |

* cited by examiner

*Primary Examiner* — Kevin A Lathers
(74) *Attorney, Agent, or Firm* — Finnegan, Henderson, Ferabow, Garret and Dunner LLP

(57) ABSTRACT

An internal combustion engine and a controller for the internal combustion engine are provided. A water axis is an injection axis of water from a water injection valve. A fuel axis is an injection axis of gaseous fuel from a fuel injection valve. The internal combustion engine has a specific cross-section that is a plane. The specific cross-section is parallel to a cylinder central axis. The specific cross-section includes a water valve tip and a fuel valve tip. In the specific cross-section, the water axis and the fuel axis intersect each other in the cylinder.

19 Claims, 2 Drawing Sheets

INTERNAL COMBUSTION ENGINE AND CONTROLLER FOR INTERNAL COMBUSTION ENGINE

BACKGROUND

1. Field

The present disclosure relates to an internal combustion engine and a controller for the internal combustion engine.

2. Description of Related Art

Japanese Laid-Open Patent Publication No. 2022-3250 discloses an internal combustion engine that includes cylinders and an intake passage. The intake passage includes a first passage, a surge tank, and a second passage. The surge tank is connected to a downstream end of the first passage. The second passage is connected to a downstream end of the surge tank. The cylinders are connected to the downstream end of the second passage.

The internal combustion engine also includes port injection valves, direct injection valves, and water injection valves. The port injection valves inject fuel into the second passage. The direct injection valves inject fuel into the cylinders, respectively. The water injection valves inject water into the first passage.

In the internal combustion engine described in the document, the finer the water injected from the water injection valves, the more easily the injected water vaporizes. That is, as the injected water becomes finer, the temperature of intake air flowing into the cylinders decreases due to the heat of vaporization. Nonetheless, the document does not take into account the atomization of water following its injection from the water injection valves.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an internal combustion engine. The internal combustion engine includes a cylindrical cylinder having a cylinder central axis. The water injection valve injects water into the cylinder. The water injection valve has a water valve tip and a water axis. The water valve tip is a tip of the water injection valve. The water axis is an injection axis of the water from the water injection valve. The fuel injection valve injects gaseous fuel into the cylinder. The fuel injection valve has a fuel valve tip and a fuel axis. The fuel valve tip is a tip of the fuel injection valve. The fuel axis is an injection axis of the gaseous fuel from the fuel injection valve. The internal combustion engine has a specific cross-section that is a plane. The specific cross-section is parallel to the cylinder central axis. The specific cross-section includes the water valve tip and the fuel valve tip. In the specific cross-section, the water axis and the fuel axis intersect each other in the cylinder.

Another aspect of the present disclosure provides a controller for an internal combustion engine. The controller includes control circuitry. A cylindrical cylinder has a cylinder central axis. An intake passage is connected to the cylinder. A water injection valve is located in the intake passage and injects water into the cylinder. The water injection valve has a water valve tip and a water axis. The water valve tip is a tip of the water injection valve. The water axis is an injection axis of the water from the water injection valve. The fuel injection valve injects gaseous fuel into the cylinder. The fuel injection valve has a fuel valve tip and a fuel axis. The fuel valve tip is a tip of the fuel injection valve. The fuel axis is an injection axis of the gaseous fuel from the fuel injection valve. The intake valve opens and closes an opening of the intake passage closer to the cylinder. The internal combustion engine has a specific cross-section that is a plane. The specific cross-section is parallel to the cylinder central axis. The specific cross-section includes the water valve tip and the fuel valve tip. In the specific cross-section, the water axis and the fuel axis intersect each other in the cylinder. The control circuitry is configured to cause the water injection valve to inject water when the intake valve is open and cause the fuel injection valve to inject the gaseous fuel before the intake valve closes.

In this configuration, most of the water injected from the water injection valve collides with the gaseous fuel injected from the fuel injection valve. When the water collides with the gaseous fuel, the particle size of the water decreases. That is, this configuration further atomizes the water injected from the water injection valve.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An internal combustion engine according to an embodiment will now be described with reference to FIGS. 1 to 3.

Schematic Structure of Internal Combustion Engine

Figure 1:
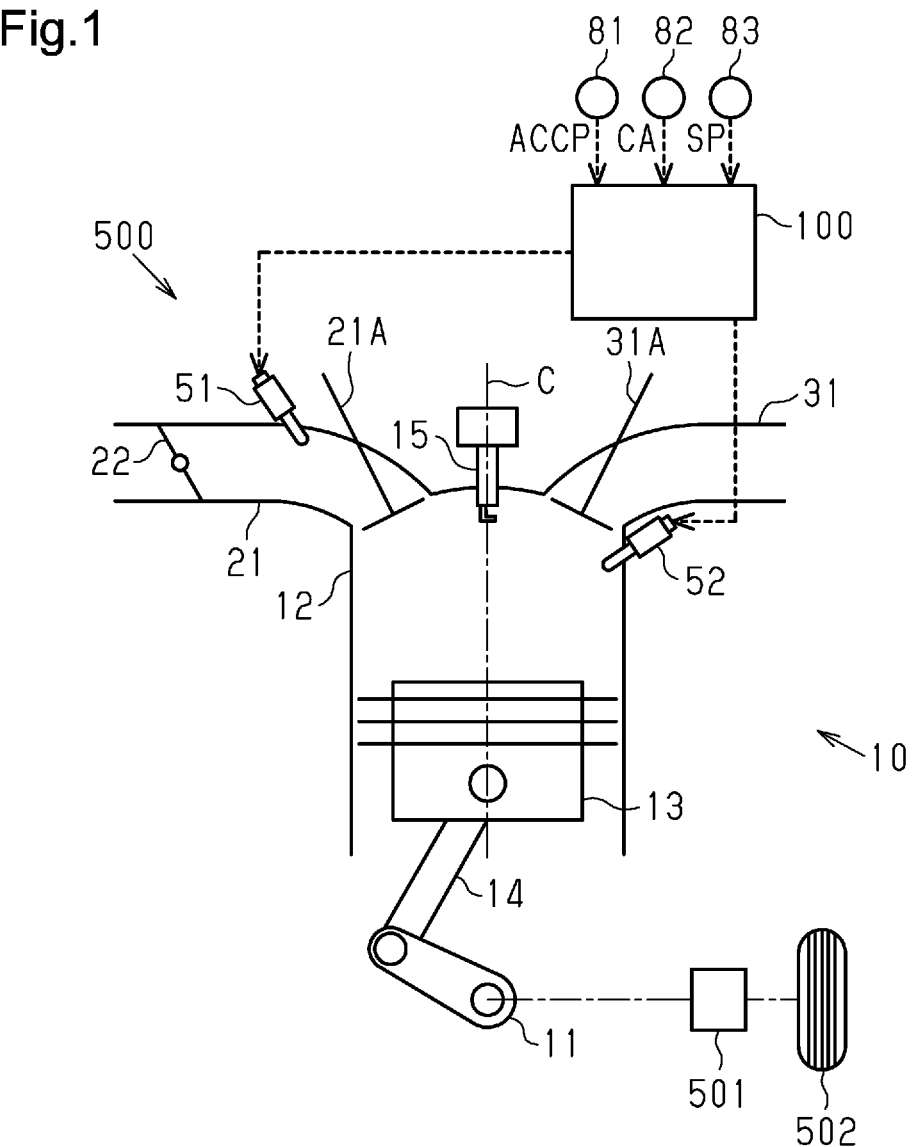
FIG. 1 is a schematic diagram showing the structure of an internal combustion engine.

As shown in FIG. 1, a vehicle 500 includes an internal combustion engine 10. The internal combustion engine 10 is a driving source of the vehicle 500. The internal combustion engine 10 includes a crankshaft 11, four cylinders 12, four pistons 13, four connecting rods 14, and four ignition plugs 15. In FIG. 1, only one of four assemblies of the cylinder 12, the piston 13, the connecting rod 14, and the ignition plug 15 is illustrated.

The cylinder 12 defines a space for burning an air-fuel mixture of fuel and intake air. The cylinder 12 has a cylindrical shape having a cylinder central axis C. The piston 13 is located in the cylinder 12. The piston 13 reciprocates in the cylinder 12 along with combustion of the air-fuel mixture. The piston 13 is coupled to the crankshaft 11 by the connecting rod 14. The phrase "in the cylinder 12" refers to a space inside the cylinder 12 that is on the side of the top dead center with respect to the piston 13 located at the bottom dead center. The connecting rod 14 converts the reciprocating motion of the piston 13 into a rotational motion of the crankshaft 11. The tip of the ignition plug 15 is located in the cylinder 12. The ignition plug 15 ignites the air-fuel mixture in the cylinder 12. The crankshaft 11 is an output shaft of the internal combustion engine 10. The crankshaft 11 is coupled to driven wheels 502 by, for example, an automatic transmission 501 and a differential (not shown).

As shown in FIG. 1, the internal combustion engine 10 includes an intake passage 21 and an exhaust passage 31. The intake passage 21 is a passage through which intake air flows. The intake passage 21 is branched and connected to each cylinder 12. The exhaust passage 31 is a passage through which exhaust gas flows. The exhaust passage 31 is branched and connected to each cylinder 12. The exhaust passage 31 is located on a side opposite to the intake passage 21 such that the cylinder central axis C of the cylinder 12 is located between the intake passage 21 and the exhaust passage 31.

The internal combustion engine 10 has four intake valves 21A and four exhaust valves 31A. In FIG. 1, only one of the four intake valves 21A and only one of the four exhaust valves 31A are illustrated. Each intake valve 21A is disposed in a corresponding cylinder 12. The intake valve 21A is located between the intake passage 21 and the cylinder 12. The intake valve 21A opens and closes the opening of the intake passage 21 closer to, or connected to, the cylinder 12. Each exhaust valve 31A is disposed in a corresponding cylinder 12. The exhaust valve 31A is located between the exhaust passage 31 and the cylinder 12. The exhaust valve 31A opens and closes the opening of the exhaust passage 31 closer to the cylinder 12.

The internal combustion engine 10 includes a throttle valve 22. The throttle valve 22 is located in the intake passage 21. The open degree of the throttle valve 22 is adjustable. The throttle valve 22 adjusts the amount of intake air flowing into the cylinder 12 depending on the open degree of the throttle valve 22.

The internal combustion engine 10 includes four water injection valves 51. In FIG. 1, only one of the four water injection valves 51 is shown. Each water injection valve 51 is disposed in a corresponding cylinder 12. The water injection valve 51 is located in the intake passage 21. Specifically, the water injection valve 51 is located relatively close to the intake valve 21A in the intake passage 21. The water injection valve 51 injects water into the cylinder 12. The water injection valve 51 is connected to a tank (not shown). The water injection valve 51 injects water when supplied with the water stored in the tank.

The internal combustion engine 10 includes four fuel injection valves 52. In FIG. 1, only one of the four fuel injection valves 52 is shown. Each fuel injection valve 52 is disposed in a corresponding cylinder 12. The fuel injection valve 52 injects hydrogen gas as gaseous fuel. The fuel injection valve 52 directly injects the gaseous fuel into the cylinder 12 without passing through the intake passage 21.

The vehicle 500 includes an accelerator pedal sensor 81, a crank angle sensor 82, and a vehicle speed sensor 83. The accelerator pedal sensor 81 detects the operation amount of an accelerator pedal of the vehicle 500 as an accelerator operation amount ACCP. The crank angle sensor 82 detects an angular position CA of the crankshaft 11. The vehicle speed sensor 83 detects a vehicle speed SP of the vehicle 500. Each of these sensors outputs a signal corresponding to a detected value.

Controller

As shown in FIG. 1, the vehicle 500 includes a controller 100. The controller 100 comprises control circuitry. The controller 100 may include circuitry including one or more processors (computer processors) that execute various processes in accordance with a computer program (software). The controller 100 may be circuitry including one or more dedicated hardware circuits such as application-specific integrated circuits (ASICs) that execute at least part of various processes. Alternatively, the controller 100 may be control circuitry including a combination of one or more processors and one or more dedicated hardware circuits. The processor includes a CPU and memories such as a RAM and a ROM. The memory stores program codes or instructions configured to cause the CPU to execute the processes. The memory, or a computer-readable medium, includes any type of non-transitory computer-readable storage medium that is accessible by a general-purpose or dedicated computer. For example, one or more computer-readable media have stored thereon instructions that, when executed by one or more processors, cause the one or more processors to perform operations. The memory includes an electrically-rewriteable non-volatile memory.

The controller 100 acquires a signal indicating the accelerator operation amount ACCP from the accelerator pedal sensor 81. The controller 100 acquires a signal indicating the angular position CA from the crank angle sensor 82. The controller 100 obtains a signal indicating the vehicle speed SP from the vehicle speed sensor 83.

The controller 100 controls the internal combustion engine 10. Specifically, the controller 100 refers to the accelerator operation amount ACCP, the angular position CA, the vehicle speed SP, and the like to perform control such as adjustment of the open degree of the throttle valve 22, the ignition timing of the ignition plug 15, and the like. Further, the controller 100 refers to the accelerator operation amount ACCP, the angular position CA, the vehicle speed SP, and the like to perform control such as adjustment of the amount of water injected from the water injection valve 51 and adjustment of the amount of fuel injected from the fuel injection valve 52.

Figure 2:
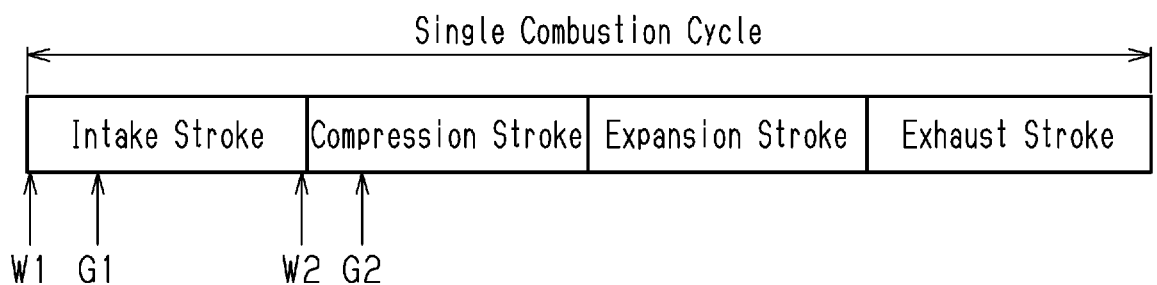
FIG. 2 is a diagram illustrating a time for injecting water from the water injection valve and a time for injecting fuel from the fuel injection valve in the internal combustion engine shown in FIG. 1.

As shown in FIG. 2, the controller 100 controls the injection time of the water injection valves 51 depending on the intake valve 21A opens or closes. The injection time of the water injection valves 51 includes, for example, a water injection start time W1 at which the water injection valve 51 starts injecting water and a water injection end time W2 at which the water injection valve 51 ends the water injection.

In the present embodiment, a single combustion cycle in one or more specific cylinders 12 is defined as a period from the point in time when the intake valve 21A opens in the specific cylinder 12 to the point in time when the intake valve 21A opens again after closes. In the single combustion cycle, the specific cylinder 12 enters each of the intake stroke, the compression stroke, the expansion stroke, and the exhaust stroke. For example, each of the intake stroke, the compression stroke, the expansion stroke, and the exhaust stroke corresponds to one of four equal parts of a single combustion cycle. In the present embodiment, for example, the intake valve 21A opens at the start of the intake stroke. Further, the intake valve 21A closes at the end of the intake stroke. When the intake valve 21A is open, the valve body of the intake valve 21A is separated from the opening of the intake passage 21 closer to the cylinder 12; specifically, from the valve seat surrounding the opening. That is, when the intake valves 21A is open, the open degree of the intake valve 21A is greater than 0%. When the intake valve 21A is closed, the valve body of the intake valve 21A is in contact with the opening of the intake passage 21 closer to the cylinder 12; specifically, in contact with the valve seat surrounding the opening. That is, when the intake valve 21A is closed, the open degree of the intake valve 21A is 0%.

When the intake valve 21A is open, the controller 100 causes the water injection valve 51 to inject water. When the intake valve 21A is closed, the controller 100 performs control such that the water injection valve 51 does not inject water. Specifically, the controller 100 sets the water injection start time W1 of the water injection valve 51 at the same time as the start time of the intake stroke. In addition, the controller 100 sets the water injection end time W2 of the water injection valves 51 almost simultaneously with the end time of the intake stroke. In other words, the controller 100 controls the injection time of the water injection valve 51 such that the fuel injected from the water injection valve 51 does not hit the valve body of the intake valve 21A as much as possible.

Further, the controller 100 controls the injection time of the fuel injection valve 52 depending on whether the intake valve 21A opens or closes. The injection time of the fuel injection valve 52 includes, for example, a fuel injection start time G1 at which fuel injection from the fuel injection valve 52 is started and a fuel injection end time G2 at which fuel injection from the fuel injection valve 52 is ended.

The controller 100 controls the fuel injection start time G1 such that the gaseous fuel injected from the fuel injection valve 52 and the water injected from the water injection valve 51 can collide with each other. Specifically, the controller 100 sets the fuel injection start time G1 of the fuel injection valve 52 in the middle of the intake stroke. That is, the controller 100 starts injecting the gaseous fuel from the fuel injection valve 52 before the intake valve 21A closes. Further, the controller 100 sets the fuel injection end time G2 of the fuel injection valve 52 in the middle of the compression stroke.

Injection Axes of Water Injection Valve and Fuel Injection Valve

Figure 3:
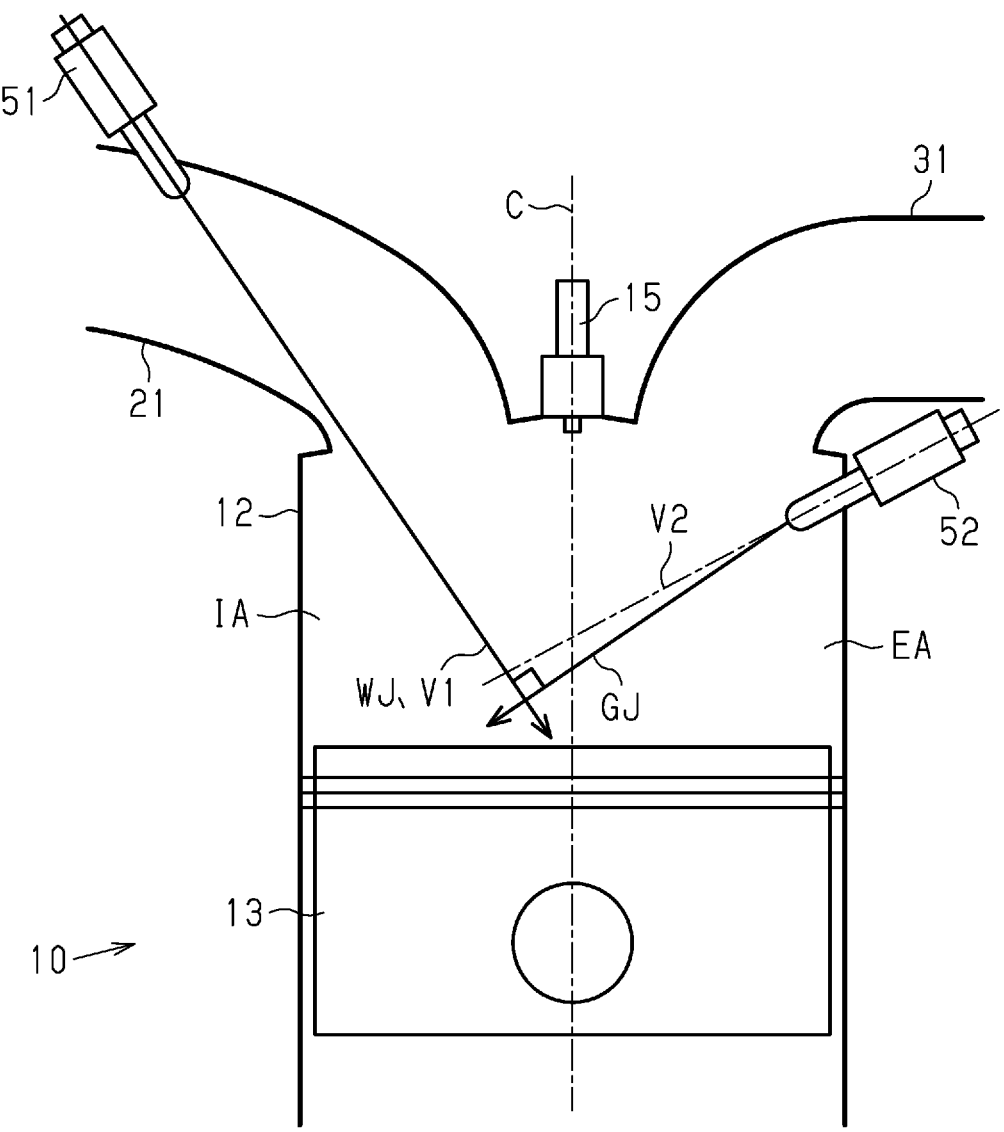
FIG. 3 is a diagram illustrating an injection axis from the water injection valve and an injection axis from the fuel injection valve in the internal combustion engine shown in FIG. 1.

As shown in FIG. 3, the water injection valve 51 has a substantially cylindrical shape having a water central axis V1 as a central axis. An injection hole opens in the tip of the water injection valve 51, that is, in a water valve tip. Water is injected from the injection hole. The fuel injection valve 52 has a substantially cylindrical shape having a fuel central axis V2 as a central axis. An injection hole opens in the tip of the fuel injection valve 52, that is, in a fuel valve tip. Gaseous fuel is injected from the injection hole. In FIG. 3, the intake valve 21A and the exhaust valve 31A are not shown.

The cylinder 12 is viewed in a specific cross-section. FIG. 3 shows the specific cross-section of the cylinder 12. The specific cross-section is a plane. That is, the plane crossing the cylinder 12 in order to obtain the specific cross-section, that is, the sheet of FIG. 3 is parallel to the cylinder central axis C of the cylinder 12. The specific cross-section includes the water valve tip of the water injection valve 51 and the fuel valve tip of the fuel injection valve 52. In the following description, viewing the cylinder 12 at the specific cross-section may be referred to as a specific cross-sectional view.

In the specific cross-sectional view, the region on the side of the intake passage 21 with respect to the cylinder central axis C as the central axis of the cylinder 12 is referred to as an intake region IA. Further, in the specific cross-sectional view, the region on the side of the exhaust passage 31 with respect to the cylinder central axis C of the cylinder 12 is referred to as an exhaust region EA. As described above, the water injection valve 51 is located in the intake passage 21. Thus, the water injection valve 51 is located in the intake region IA. The fuel injection valve 52 is located in the exhaust region EA.

The water injected from the water injection valve 51 is injected around the water axis WJ as an injection axis of the water. The water axis WJ of the water injection valve 51 is determined by the position and size of the injection hole of the water injection valve 51. Specifically, the direction of a maximum water hole view is identified. The maximum water hole view is determined such that the apparent area of the injection hole in the water injection valve 51 is maximized when the injection hole in the water injection valve 51 is seen along the maximum water hole view. If the opening edge of the injection hole of the water injection valve 51 is on a water opening plane that serves as a plane, the direction of the maximum water hole view is orthogonal to the water opening plane. The water axis WJ is a straight line that is parallel to the direction of the maximum water hole view and passes through the center of the opening of the injection hole in the water injection valve 51. In the present embodiment, the water axis WJ of the water injection valve 51 coincides with the water central axis V1 as the central axis of the water injection valve 51.

The gaseous fuel injected from the fuel injection valve 52 is injected around a fuel axis GJ as an injection axis of the gaseous fuel. The fuel axis GJ of the fuel injection valve 52 is determined by the position and size of the injection hole in the fuel injection valve 52. Specifically, the orientation of the maximum fuel hole view is identified. The maximum fuel hole view is determined such that the apparent area of the injection hole in the fuel injection valve 52 is maximized when the injection hole of the fuel injection valve 52 is seen along the maximum fuel hole view. The fuel axis GJ is a straight line that is parallel to the direction of the maximum fuel hole view and passes through the center of the opening of the injection hole. In the present embodiment, in the specific cross-sectional view shown in FIG. 3, the fuel axis GJ of the fuel injection valve 52 is located in a side farther from the water injection valve 51 with respect to the fuel central axis V2 as the central axis of the fuel injection valve 52. In other words, the fuel axis GJ of the fuel injection valve 52 is located on the side of the bottom dead center of the piston 13 with respect to the fuel central axis V2 of the fuel injection valve 52. In the specific cross-sectional view, the water axis WJ of the water injection valve 51 and the fuel axis GJ of the fuel injection valve 52 intersect each other in the cylinder 12. In the present embodiment, in the specific cross-sectional view shown in FIG. 3, the angle formed by the water axis WJ of the water injection valve 51 and the fuel axis GJ of the fuel injection valve 52 is about 90 degrees.

Operation of Present Embodiment

In the specific cross-sectional view, the water axis WJ of the water injection valve 51 and the fuel axis GJ of the fuel injection valve 52 intersect each other in the cylinder 12. Thus, the water injected from the water injection valve 51 collides with the gaseous fuel injected from the fuel injection valve 52.

Advantages of Present Embodiment (1) In the above embodiment, most of the water injected from the water injection valve 51 collides with the gaseous fuel injected from the fuel injection valve 52. When the water collides with the gaseous fuel, the particle size of the water decreases. That is, this configuration further atomizes the water injected from the water injection valve 51.

(2) In the above embodiment, the water injection valve 51 is located in the intake region IA. The fuel injection valve 52 is located in the exhaust region EA. In this configuration, the water from the water injection valve 51 is scattered from the intake side area IA to the exhaust region EA. The gaseous fuel from the fuel injection valve 52 is scattered from the exhaust region EA to the intake side area IA. That is, the water and the gaseous fuel are injected in opposite directions as a whole. This allows the gaseous fuel to collide with the water with momentum, thereby promoting the atomization of the water.

(3) In the above embodiment, the fuel axis GJ of the fuel injection valve 52 is located farther from the water injection valve 51 than the fuel central axis V2 of the fuel injection valve 52. That is, the gaseous fuel is injected toward the side farther from the water injection valve 51 with respect to the fuel central axis V2 of the fuel injection valve 52. In other words, water is less likely to collide with the injected fuel. Even in the configuration in which the collision is limited, the water axis WJ of the water injection valve 51 and the fuel axis GJ of the fuel injection valve 52 intersect each other. As a result, the water injected from the water injection valve 51 is atomized.

(4) In the above embodiment, the controller 100 causes the water injection valve 51 to inject water when the intake valve 21A are open. Further, the controller 100 causes the fuel injection valve 52 to inject the gaseous fuel before the intake valve 21A closes. That is, while the water from the water injection valve 51 is flowing into the cylinder 12, the gaseous fuel is injected from the fuel injection valve 52. This allows the gaseous fuel to collide with a large amount of water and thus efficiently atomizes water.

(5) In the above embodiment, the controller 100 sets the water injection start time W1 of the water injection valve 51 at the same time as the start time of the intake stroke. Further, the controller 100 sets the water injection end time W2 of the water injection valves 51 to be the same as the end time of the intake stroke. This configuration prevents the injected water from colliding with the intake valve 21A. That is, water droplets each having a relatively large particle size are prevented from being generated. In other words, droplets each having a relatively large particle diameter are prevented from flowing into the cylinder 12.

Modifications

The above embodiment and the following modifications can be combined as long as the combined modifications remain technically consistent with each other.

The structure of the internal combustion engine 10 of the above embodiment is merely an example and may be changed. For example, the number of the cylinders 12 is not limited to four. Instead, the number of the cylinders 12 may be three or less or five or more.

In addition to the fuel injection valve 52 of the above embodiment, a port injection valve that injects fuel into the intake passage 21 may be provided. When the internal combustion engine includes the port injection valve, the relationship between the injection axis of the port injection valve and the water axis WJ of the water injection valve 51 does not matter.

The gaseous fuel injected by the fuel injection valve 52 is not limited to hydrogen gas. For example, natural gas such as propane gas may be used.

The opening and closing time of the intake valve 21A described in the above embodiment is merely an example. For example, the time at which the intake valve 21A opens may be in the middle of the exhaust stroke or in the middle of the intake stroke. Similarly, the time at which the intake valve 21A closes may be in the middle of the intake stroke or in the middle of the compression stroke.

In the above embodiment, the water injection start time W1 and the water injection end time W2 of the water injection valve 51 are not limited to the examples of the above embodiment. When the intake valve 21A are open, the controller 100 may inject at least some of the water injected from the water injection valves 51. That is, a part of the period during which the water injection valve 51 injects water may overlap the period during which the intake valve 21A is closed. Similarly, the fuel injection start time G1 and the fuel injection end time G2 of the fuel injection valve 52 are not limited to the examples of the embodiment described above. The controller 100 may inject at least some of the gaseous fuel injected from the fuel injection valve 52 before the intake valve 21A closes.

In the above embodiment, the angle formed by the water axis WJ of the water injection valve 51 and the fuel axis GJ of the fuel injection valve 52 may be any angle. Any angle may be formed if the water axis WJ and the fuel axis GJ are at least not parallel to each other so that the water axis WJ and the fuel axis GJ intersect each other in the cylinder 12.

In the specific cross-section of the above embodiment, the fuel axis GJ of the fuel injection valve 52 may be located on the side of the water injection valve 51 with respect to the fuel central axis V2 of the fuel injection valve 52. Further, the fuel axis GJ of the fuel injection valve 52 may coincide with the fuel central axis V2 of the fuel injection valve 52. In the specific cross-sectional view, the water axis WJ of the water injection valve 51 does not have to coincide with the water central axis V1 of the water injection valve 51.

In the specific cross-sectional view of the above embodiment, both the water injection valve 51 and the fuel injection valve 52 may be located in the intake region IA. That is, the water injection valve 51 and the fuel injection valve 52 may be both located in the intake region IA. This configuration allows the water from the water injection valve 51 to be diffused to the exhaust region EA by the flow of the gaseous fuel from the intake region IA to the exhaust region EA. As a result, the water is readily distributed throughout the cylinder 12.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An internal combustion engine, comprising:
    a cylindrical cylinder having a cylinder central axis;
    an intake passage connected to the cylinder;
    a water injection valve located in the intake passage and configured to inject water into the cylinder, the water injection valve having a water valve tip and a water axis, the water valve tip being a tip of the water injection valve, and the water axis being an injection axis of the water from the water injection valve; and
    a fuel injection valve configured to inject gaseous fuel directly into the cylinder, the fuel injection valve having a fuel valve tip and a fuel axis, the fuel valve tip being a tip of the fuel injection valve, and the fuel axis being a main injection axis of the gaseous fuel from the fuel injection valve, wherein
    the internal combustion engine has a specific cross-section that is a plane parallel to the cylinder central axis, the specific cross-section including the water valve tip and the fuel valve tip, and
    the water axis and the fuel axis intersect each other in the cylinder in the specific cross-section, wherein the fuel axis is located farther from the water injection valve than a central axis of the fuel injection valve in the specific cross-section.

2. The internal combustion engine according to claim 1, further comprising:
    an exhaust passage connected to the cylinder, wherein
    the specific cross-section includes an intake region on a side of the intake passage with respect to the cylinder central axis and an exhaust region on a side of the exhaust passage with respect to the cylinder central axis,
    the water injection valve is located in the intake region, and
    the fuel injection valve is located in the exhaust region.

3. The internal combustion engine according to claim 1, wherein:
    the specific cross-section includes an intake region on a side of the intake passage with respect to the cylinder central axis and an exhaust region on a side of the exhaust passage with respect to the cylinder central axis, and
    the water injection valve and the fuel injection valve are both located in the intake region.

4. The internal combustion engine according to claim 1, wherein the fuel axis of the fuel injection valve is located on the side of the bottom dead center of the piston with respect to the central axis of the fuel injection valve.

5. The internal combustion engine according to claim 1, wherein the fuel axis of the fuel injection valve is determined by a position and a size of an injection hole opening into the fuel valve tip of the fuel injection valve.

6. The internal combustion engine according to claim 5, wherein a maximum cross-sectional area of the opening of the injection hole into the fuel valve tip is perpendicular to the main injection axis of the gaseous fuel passing through the center of the opening of the injection hole into the fuel valve tip.

7. The internal combustion engine according to claim 1, wherein the water axis of the water injection valve is determined by a position and a size of an injection hole opening into the water valve tip of the water injection valve.

8. The internal combustion engine according to claim 7, wherein a maximum cross-sectional area of the opening of the injection hole into the water valve tip is perpendicular to the injection axis of the water passing through the center of the opening of the injection hole into the water valve tip.

9. A controller for an internal combustion engine, the controller comprising control circuitry, wherein
    the internal combustion engine includes:
    a cylindrical cylinder having a cylinder central axis;
    an intake passage connected to the cylinder;
    a water injection valve located in the intake passage and configured to inject water into the cylinder, the water injection valve having a water valve tip and a water axis, the water valve tip being a tip of the water injection valve, and the water axis being an injection axis of the water from the water injection valve;
    a fuel injection valve configured to inject gaseous fuel directly into the cylinder, the fuel injection valve having a fuel valve tip and a fuel axis, the fuel valve tip being a tip of the fuel injection valve, and the fuel axis being a main injection axis of the gaseous fuel from the fuel injection valve; and
    an intake valve that opens and closes an opening of the intake passage closer to the cylinder, wherein
    the internal combustion engine has a specific cross-section that is a plane parallel to the cylinder central axis, the specific cross-section including the water valve tip and the fuel valve tip,
    the water axis and the fuel axis intersect each other in the cylinder in the specific cross-section, and
    the control circuitry is configured to:
    cause the water injection valve to inject the water when the intake valve is open; and
    cause the fuel injection valve to inject the gaseous fuel before the intake valve closes, wherein the fuel axis is located farther from the water injection valve than a central axis of the fuel injection valve in the specific cross-section.

10. The controller for the internal combustion engine according to claim 9, wherein the fuel axis of the fuel injection valve is located on the side of the bottom dead center of the piston with respect to the central axis of the fuel injection valve.

11. The controller for the internal combustion engine according to claim 9, wherein the control circuitry is further configured to set a start of the water injection from the water injection valve at the same time as a start of an intake stroke that begins when the intake valve opens the opening of the intake passage into the cylinder and an end of the water injection at the same time as an end of the intake stroke that ends when the intake valve closes the opening of the intake passage into the cylinder.

12. The controller for the internal combustion engine according to claim 11, wherein the control circuitry is further configured to set a fuel injection start time of the fuel injection valve in a middle of the intake stroke.

13. The controller for the internal combustion engine according to claim 9, wherein the angle formed by the water axis and the fuel axis is about 90 degrees.

14. The controller for the internal combustion engine according to claim 9, wherein the water injected from the water injection valve collides with the gaseous fuel injected from the fuel injection valve, causing atomization of the water injected from the water injection valve.

15. The controller for the internal combustion engine according to claim 14, wherein a particle size of the water injected from the water injection valve is decreased as a result of the collision between the water and the gaseous fuel.

16. The controller for the internal combustion engine according to claim 9, wherein the control circuitry is further configured to set at least a part of a water injection period of time occurring between a start of the water injection from the water injection valve to an end of the water injection such that the water injection period of time overlaps with a period during which the intake valve is closed.

17. The controller for the internal combustion engine according to claim 9, wherein the fuel axis of the fuel injection valve is determined by a position and a size of an injection hole opening into the fuel valve tip of the fuel injection valve.

18. The controller for the internal combustion engine according to claim 17, wherein a maximum cross-sectional area of the opening of the injection hole into the fuel valve tip is perpendicular to the main injection axis of the gaseous fuel passing through the center of the opening of the injection hole into the fuel valve tip.

19. The controller for the internal combustion engine according to claim 9, wherein a maximum cross-sectional area of an opening of an injection hole into the water valve tip is perpendicular to the injection axis of the water passing through the center of the opening of the injection hole into the water valve tip.

* * * * *